US012023699B2

(12) United States Patent
Manou et al.

(10) Patent No.: US 12,023,699 B2
(45) Date of Patent: Jul. 2, 2024

(54) CONTAINER PROCESSING SYSTEM

(71) Applicant: Toyo Seikan Co., Ltd., Tokyo (JP)

(72) Inventors: Taketoshi Manou, Yokohama (JP); Kouhei Endo, Yokohama (JP); Takuya Mori, Yokohama (JP); Masaaki Fujitani, Yokohama (JP); Tomoyuki Miyazaki, Ibaraki (JP); Keisuke Nyuu, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 799 days.

(21) Appl. No.: 17/110,645

(22) Filed: Dec. 3, 2020

(65) Prior Publication Data

US 2021/0086216 A1   Mar. 25, 2021

Related U.S. Application Data

(63) Continuation of application No. PCT/JP2019/021047, filed on May 28, 2019.

(30) Foreign Application Priority Data

Jun. 15, 2018   (JP) ................................. 2018-114141

(51) Int. Cl.
*B65G 19/18*   (2006.01)
*B05B 12/00*   (2018.01)
(Continued)

(52) U.S. Cl.
CPC ............ *B05B 15/70* (2018.02); *B05B 12/008* (2013.01); *B05B 13/0221* (2013.01);
(Continued)

(58) Field of Classification Search
CPC .............. B05B 13/0221; B05B 13/025; B05B 13/0609; B65G 19/185–265;
(Continued)

(56) References Cited

U.S. PATENT DOCUMENTS 5,070,992 A    12/1991   Bonkowski
5,078,313 A *   1/1992   Matheson ........... B05B 13/0627
                                                118/314
(Continued)

FOREIGN PATENT DOCUMENTS

JP        46-29994 Y1   10/1971
JP        61-053306 U    4/1986
(Continued)

OTHER PUBLICATIONS

International Search Report dated Aug. 13, 2019, issued in counterpart application No. PCT/JP2019/021047,w/ English translation (4 pages).
(Continued)

*Primary Examiner* — Dah-Wei D. Yuan
*Assistant Examiner* — Stephen A Kitt
(74) *Attorney, Agent, or Firm* — WHDA, LLP

(57) ABSTRACT

Provided is a container processing system capable of improving a speed of processing containers with a simple configuration and providing a compact production line. The container processing system (10) includes a container conveyer (20) having a container conveying path (21*a*) that conveys containers (C) arranged in a row and a container processor (40) that performs processing on the containers (C) in a container processing area (A2) set lateral to a container transfer area (A1) set in a segment of the container conveying path (21*a*). The container conveyer (40) includes a container carrier (21) conveying the containers (C) arranged in the row along the container conveying path (21*a*) and a container transferer (22) moving a container row including the plurality of containers (C) arranged in the row in the container transfer area (A1) toward the container processing area (A2).

9 Claims, 9 Drawing Sheets

(51) Int. Cl.
  *B05B 13/02* (2006.01)
  *B05B 13/04* (2006.01)
  *B05B 13/06* (2006.01)
  *B05B 15/58* (2018.01)
  *B05B 15/70* (2018.01)
  *B05B 1/00* (2006.01)
  *B05B 15/50* (2018.01)

(52) U.S. Cl.
  CPC ........ *B05B 13/0278* (2013.01); *B05B 13/041* (2013.01); *B05B 13/0609* (2013.01); *B05B 13/0636* (2013.01); *B05B 13/069* (2013.01); *B05B 15/58* (2018.02); *B65G 19/185* (2013.01); *B05B 1/005* (2013.01); *B05B 15/50* (2018.02)

(58) Field of Classification Search
  CPC .... B65G 2201/0235; B65G 2201/0244; B65G 2201/0247
  See application file for complete search history.

(56) References Cited

U.S. PATENT DOCUMENTS

| | | | |
|---|---|---|---|
| 5,123,228 A | 6/1992 | Bonkowski et al. | |
| 5,281,446 A | 1/1994 | Matheson et al. | |
| 5,456,754 A | 10/1995 | Matheson et al. | |
| 5,662,207 A | 9/1997 | Lehmann | |
| 5,975,278 A * | 11/1999 | Ruth | B65G 47/847 198/377.07 |
| 2004/0035838 A1* | 2/2004 | Merard | H05H 1/34 219/121.43 |
| 2016/0368013 A1 | 12/2016 | Okada et al. | |
| 2018/0133738 A1 | 5/2018 | Endo et al. | |
| 2018/0214900 A1 | 8/2018 | Okada et al. | |

FOREIGN PATENT DOCUMENTS

| | | |
|---|---|---|
| JP | 3-14415 A | 1/1991 |
| JP | 6-92346 A | 4/1994 |
| JP | 7-251927 A | 10/1995 |
| JP | 5790967 B1 | 10/2015 |
| WO | 2015162951 A1 | 10/2015 |
| WO | 2017/010247 A1 | 1/2017 |

OTHER PUBLICATIONS

Written Opinion dated Aug. 13, 2019, issued in counterpart application No. PCT/JP2019/021047 (4 pages).

* cited by examiner

CONTAINER PROCESSING SYSTEM

TECHNICAL FIELD

The present invention relates to a container processing system that performs processing on containers.

BACKGROUND ART

As a container processing system that performs various processing on containers made of a plastic or the like, a coater for coating an inner wall surface of each of containers with a coating agent for improving a slipping property of a viscous content, such as a mayonnaise-like food item, is known conventionally (see, e.g., Patent Literature 1).

The coater described in Patent Literature 1 is configured such that a coating agent is ejected from a spray nozzle inserted in the container to coat the inner wall surface of the container with the coating agent.

CITATION LIST

Patent Literature

[Patent Literature 1] Japanese Patent No. 5790967

SUMMARY OF INVENTION

Technical Problem

However, the coater as described in Patent Literature 1 has a property by which, since it is necessary to insert/extract a spray nozzle into/from each of containers every time coating processing is performed on the container, a long time is required to perform processing on each of the containers. When such a coater is to be incorporated at an intermediate point in a container production line that conveys containers in a single row by using a conveyer belt or the like, a problem arises in that a speed of producing the containers decreases or the production line is elongated.

The present invention is intended to solve such a problem, and an object of the present invention is to provide a container processing system capable of improving a speed of processing containers with a simple configuration and providing a compact production line.

Solution to Problem

The present invention solves the problems described above by providing a container processing system for performing processing on containers, the container processing system including: a container conveyer including a container conveying path for conveying the containers arranged in a row; and a container processor for performing processing on the containers in a container processing area set lateral to a container transfer area set in a segment of the container conveying path, the container conveyer including a container carrier for conveying the containers arranged in the row along the container conveying path and a container transferer for moving, toward the container processing area, a container row including the plurality of containers arranged in the row in the container transfer area.

Advantageous Effects of Invention

According to one aspect of the present invention, a container processing system includes: a container conveyer including a container conveying path for conveying containers arranged in a row; and a container processor for performing processing on the containers in a container processing area set lateral to a container transfer area set in a segment of the container conveying path, and the container conveyer includes a container carrier for conveying the containers arranged in the row along the container conveying path and a container transferer for moving, toward the container processing area, a container row including the plurality of containers arranged in the row in the container transfer area. Consequently, it is possible to collectively feed the plurality of containers on a per row basis from the container transfer area to the container processing area and simultaneously perform processing on the plurality of containers in the container processing area. Therefore, it is possible to improve the speed of processing the containers without complicating a device configuration.

According to another aspect of the present invention, the container transferer includes a feeding pusher having a feeding surface for collectively pushing the container row in the container transfer area toward the container processing area. This allows respective positions of the containers to be aligned in a direction in which the feeding pusher feeds the container row in the container processing area. Therefore, it is possible to allow the container processor to perform appropriate processing on the plurality of containers.

According to another aspect of the present invention, the container conveyer includes a guide for positioning, in a container row direction in which the containers are arranged, each of the containers arranged in the row in the container processing area, and the guide includes a plurality of guide pieces formed in the container processing area in a state of being arranged at predetermined intervals along the container row direction and configured to cause the containers to be disposed therebetween individually, thereby positioning the containers. This allows the containers to be positioned even in the container row direction in the container processing area. Therefore, it is possible to allow the container processor to perform appropriate processing on the plurality of containers.

According to another aspect of the present invention, each of the guide pieces has a front-side guide end portion located on the container transfer area side, and the plurality of guide pieces are formed such that the front-side guide end portion of the guide piece located on an outer side in the container row direction is located at a position more distant from the container transfer area than the front-side guide end portion of the guide piece located on a center side in the container row direction.

Therefore, it is possible to smoothly insert each of the containers between the guide pieces, while gradually dispersing the individual containers from the center side to the outer side in the container row direction.

According to another aspect of the present invention, the container conveyer includes a container presence/absence sensor for detecting whether or not the containers are held by container holders conveyed along the container conveying path. This can prevent the container holder that does not hold the container from being fed into the container processing area and also prevent processing such as ejection of the coating agent from being performed on the container holder that does not contain the container. Therefore, it is possible to prevent the container holder from being contaminated by the coating agent or the like.

According to another aspect of the present invention, the container conveyer includes a container holder number sensor for counting the number of the container holders and a container stopper disposed at an entrance of the container transfer area to prevent the containers from moving to the container transfer area on the basis of the number of the container holders counted by the container holder number sensor. Therefore, it is possible to feed a predetermined number of the containers into the container transfer area and appropriately transfer the containers from the container transfer area to the container processing area.

According to another aspect of the present invention, the container conveyer includes an alignment checking sensor for checking positions, at which the containers in the container row are aligned, in the container transfer area.
Therefore, it is possible to appropriately transfer the containers from the container transfer area to the container processing area.

According to another aspect of the present invention, the container processor includes a plurality of container treaters disposed to be arranged along the container row direction in the container processing area and performing processing on the containers individually. Consequently, it is possible to simultaneously perform processing on the containers arranged along the container row direction in the container processing area and thereby reduce a time required to process the containers.

According to another aspect of the present invention, the container processor includes a coater for coating an inner wall surface of each of the containers with a coating agent in the container processing area and a mist collector for collecting mist in each of the containers in a second container processing area set lateral to the container processing area and on an opposite side thereof to the container transfer area, and the container conveyer includes a second container transferer for moving the container row in the container processing area for the coater toward the second container processing area for the mist collector.
Consequently, after coating processing is simultaneously performed on the plurality of containers, mist collecting processing can simultaneously be performed on the plurality of containers. Therefore, it is possible to improve the speed of processing the containers without complicating the device configuration.

DESCRIPTION OF EMBODIMENTS

Referring to drawings, a description will be given of a container processing system 10 as an embodiment of the present invention.

First, the container processing system 10 performs various processing on containers C. In the present embodiment, the container processing system 10 performs coating processing of coating an inner wall surface of each of the containers C in which a viscous content, such as a mayonnaise-like food item, is to be contained with a coating agent for improving a slipping property of the content as well as mist collecting processing of collecting mist (such as an atomized coating agent) in each of the containers C.

Figure 1:
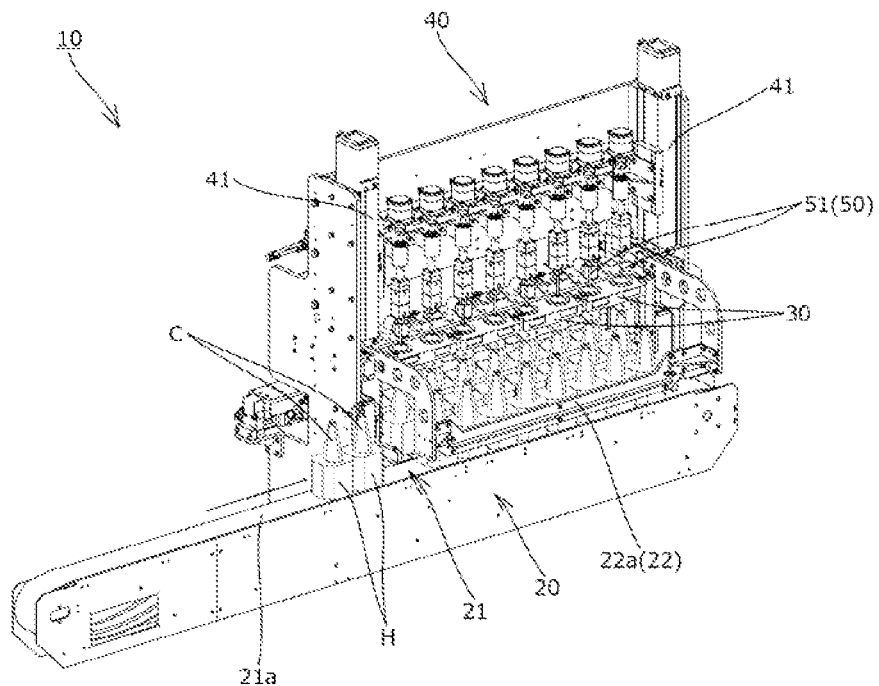
FIG. 1 is a perspective view illustrating a container processing system according to an embodiment of the present invention.

As illustrated in FIG. 1 and the like, the container processing system 10 includes a container conveyer 20 that conveys the containers C, chambers 30 each having a gas flow control chamber 35 in an inside thereof, a container processor 40 including a coater 50 that performs the coating processing on the containers C and a mist collector 60 that performs the mist collecting processing on the containers C, a aspirator 70 connected to each of the chambers 30 to suck in a gas in the gas flow control chamber 35, and a control unit including a PLC having a CPU, a ROM, a RAM, and the like, a personal computer, and the like to control the individual parts.

A specific description will be given below of the individual components of the container processing system 10.

Note that a "container conveyance direction" used in the following description is a direction in which the containers C are conveyed by a container carrier 21 described later, a "container transfer direction" used in the following description is a direction in which the containers C are transferred by container transferer 22 and 23 described later, and a "container row direction" used in the following description is a direction in which the plurality of containers C are arranged in each of areas A1 to A3 described later.

Figure 4:
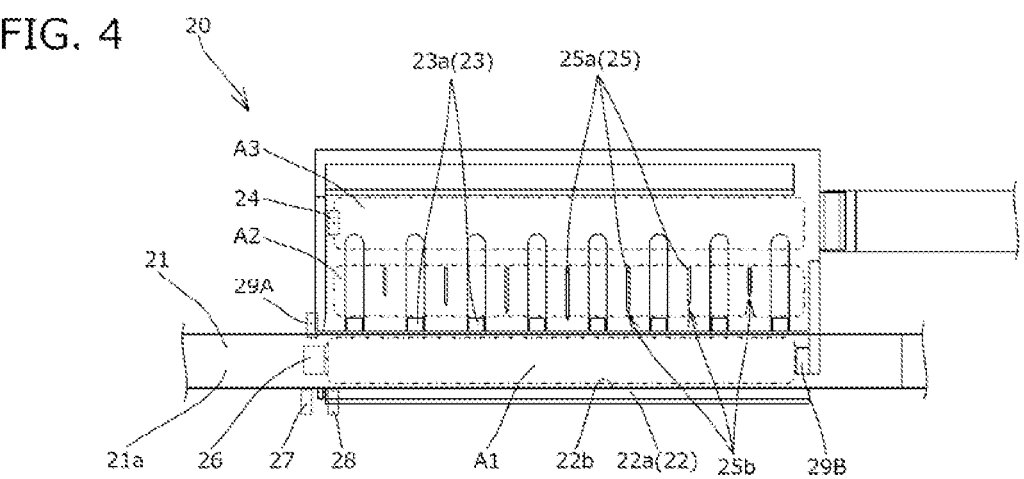
FIG. 4 is an illustrative view illustrating a container conveyer viewed from above.

The container conveyer 20 conveys the containers C being held by upwardly opened container holders H. As illustrated in FIG. 4, the container conveyer 20 includes the container carrier 21 that conveys the containers C arranged in a row along a container conveying path 21a, the first container transferer 22 that moves a container row including the plurality of containers C arranged in a row in the container transfer area A1 set in a segment of the container conveying path 21a (a downstream segment of the container conveying path 21a in the present embodiment) toward the first container processing area A2 where the coating processing is performed on the containers C, the second container transferer 23 that moves the container row in the first container processing area A2 toward the second container processing area A3 where the mist collecting processing is performed on the containers C, and a lever 24 that feeds the container row in the second container processing area A3 to a downstream side.

As illustrated in FIGS. 1 and 4, the container carrier 21 is formed of a conveyer belt that conveys the containers C arranged in a single row. An upper surface of the conveyer belt forms the linearly extending container conveying path 21a.

As illustrated in FIG. 4, the first container transferer 22 has a first feeding pusher 22a provided to be movable along the container transfer direction and collectively push and move the container row in the container transfer area A1 toward the first container processing area A2. The first feeding pusher 22a has a feeding surface 22b having a flat surface shape. The feeding surface 22b may also have a shape along outer shapes of the container holders H. In this case, it is also possible to provide the feeding surface 22b with a function of dispersing and positioning the plurality of container holders H in the container row direction.

As illustrated in FIG. 4, the second container transferer 23 includes a plurality of second feeding pushers 23a provided to be movable in the container transfer direction (and in a vertical direction) and push and move the container row in the first container processing area A2 toward the second container processing area A3. As can be seen from FIGS. 5 and 6, the second feeding pusher 23a also has a function of positioning the container row in the container transfer direction when the container row is moved from the container transfer area A1 to the first container processing area A2.

The feeding pushers 22a and 23a and the lever 24 are driven by a drive source including various actuators of an electrically-powered type, a hydraulically-driven type, an air-driven type, and the like, various motors, and the like.

The container conveyer 20 also includes, as components other than those described above, a guide 25 that positions, in the container row direction, each of the containers C arranged in the row in the first container processing area A2, a container presence/absence sensor 26 disposed around the container conveying path 21a, a container holder number sensor 27 disposed in the vicinity of an entrance of the container transfer area A1, an alignment checking sensor 28 disposed around the container transfer area A1, a container stopper 29A disposed at the entrance of the container transfer area A1, and a stopper 29B disposed at a downstream end of the container transfer area A1 to regulate movement of the containers C to the downstream side, as illustrated in FIG. 4.

As illustrated in FIG. 4, the guide 25 has a plurality of guide pieces 25a. The plurality of guide pieces 25a are disposed in the first container processing area A2 to be arranged at predetermined intervals along the container row direction.

Each of the guide pieces 25a has a front-side guide end portion 25b located on the container transfer area A1 side. The plurality of guide pieces 25a are formed such that the front-side guide end portion 25b of the guide piece 25a located on an outer side in the container row direction is located at a position more distant from the container transfer area A1 than the front-side guide end portion 25b of the guide piece 25a located on a center side in the container row direction.

The container presence/absence sensor 26 detects whether or not the containers C are held by the respective container holders H conveyed along the container conveying path 21a. When it is detected by the container presence/absence sensor 26 that the containers C are not held by the container holders H, the container processing system 10 is configured to stop operating.

The container holder number sensor 27 counts the number of the container holders H transmitted to the container transfer area A1. The container stopper 29A is configured to stop movement of the container holders H to the container transfer area A1 on the basis of the number of the container holders H counted by the container holder number sensor 27.

The alignment checking sensor 28 checks positions, at which the containers in the container row are aligned, in the container transfer area A1. When it is detected by the alignment checking sensor 28 that the positions in the container transfer area A1 at which the containers in the container row are aligned are out of order, the container processing system 10 is configured to stop operating.

Next, a description will be given below of the chambers 30.

Figure 2:
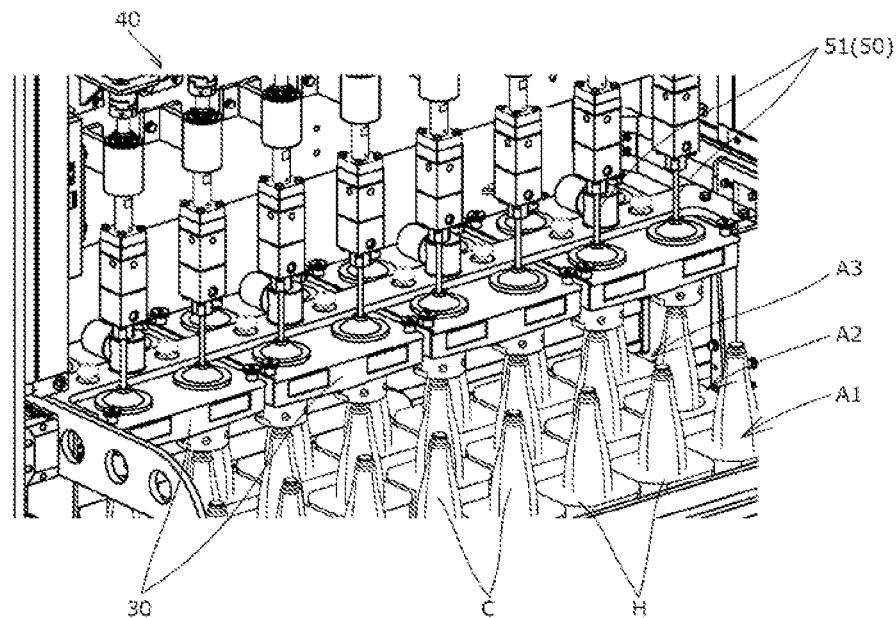
FIG. 2 is a perspective view illustrating a portion of FIG. 1 in enlarged relation.
Figure 3:
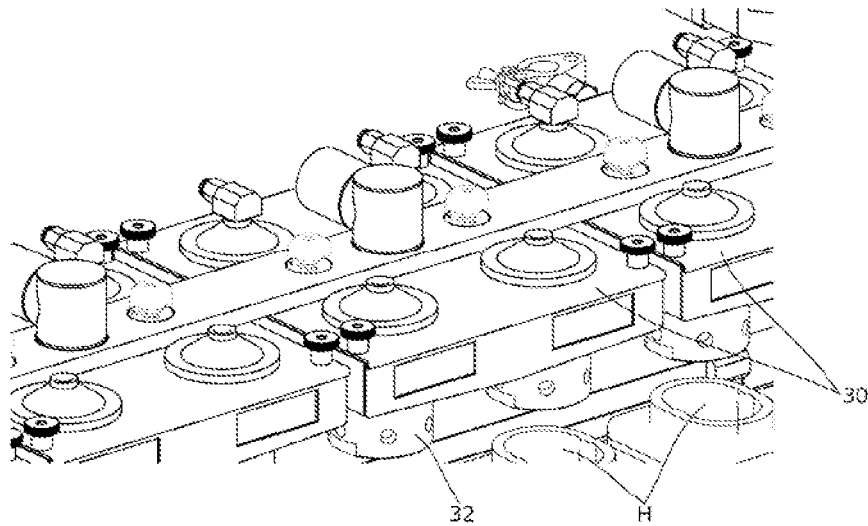
FIG. 3 is a perspective view illustrating a portion of FIG. 2 in enlarged relation.

Each of the chambers 30 is disposed to extend between the first container processing area A2 and the second container processing area A3 and perform various processing (the coating processing and the mist collecting processing) on the containers C in an inside thereof. In the present embodiment, as illustrated in FIGS. 1 to 3, the plurality of (four) chambers 30 are disposed to be arranged along the container row direction.

Figure 8:
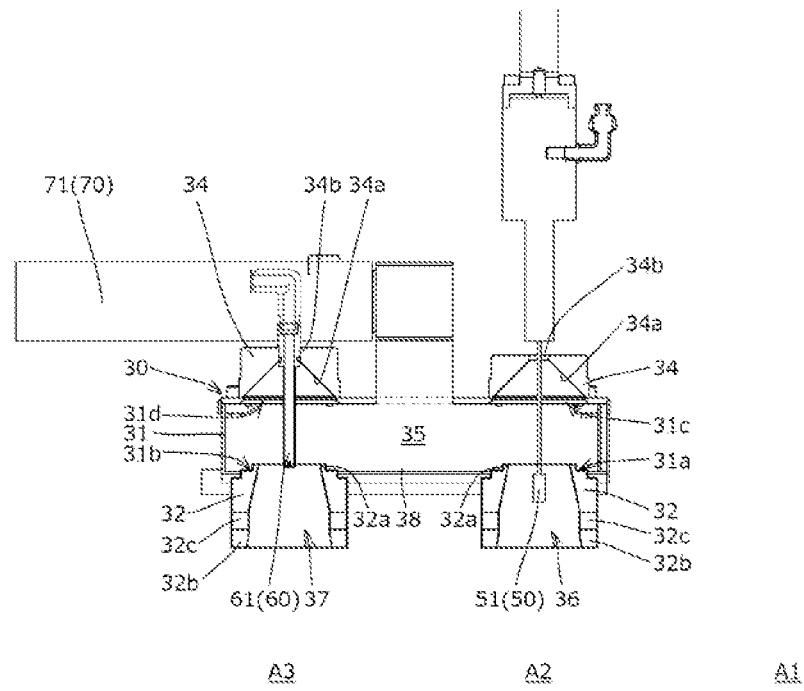
FIG. 8 is an illustrative view illustrating a chamber and a container processor each viewed in cross section.
Figure 9:
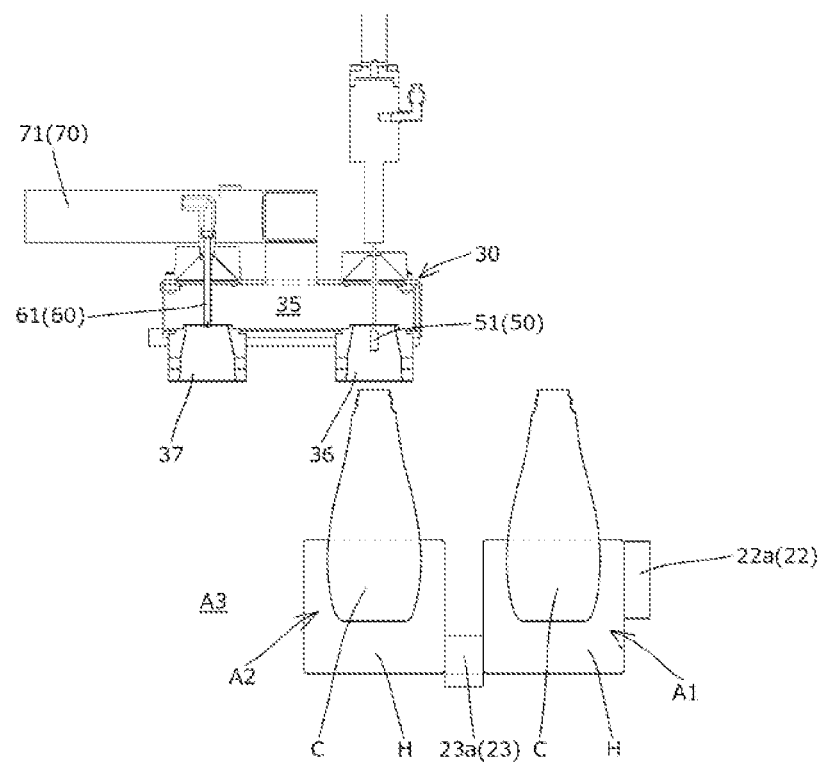
FIG. 9 is an illustrative view illustrating a first step of a container processing method.

As illustrated in FIG. 8, each of the chambers 30 includes a chamber main body 31 formed of a metal or the like, centering guides 32 formed of a synthetic resin or the like, and attachment caps 34.

As illustrated in FIG. 8 and the like, each of the chamber main bodies 31 has, in a lower surface thereof, a plurality of (two) first main body openings 31a formed to be arranged in the container row direction in the first container processing area A2 and a plurality of (two) second main body openings 31b formed to be arranged in the container row direction in the second container processing area A3 located on a rear side of the first container processing area A2 in the container transfer direction.

As illustrated in FIG. 8 and the like, each of the chamber main bodies 31 also has, in an upper surface thereof, a plurality of (two) third main body openings 31c formed to be arranged in the container row direction in the first container processing area A2 and a plurality of (two) fourth main body openings 31d formed to be arranged in the container row direction in the second container processing area A3.

As illustrated in FIG. 8 and the like, the first main body openings 31a and the third main body openings 31c are formed at positions opposed to each other in the vertical direction, while the second main body openings 31b and the fourth main body openings 31d are formed at positions opposed to each other in the vertical direction.

Each of the centering guides 32 is formed to have a substantially cylindrical shape. As illustrated in FIG. 8 and the like, the centering guides 32 are portions functioning as cylindrical portions inserted in the first main body openings 31a and the second main body openings 31b of the chamber main body 31 to be fixed thereto and allow portions of the containers C to be inserted therein when the containers are processed.

As illustrated in FIG. 8 and the like, each of the centering guides 32 includes an inner projecting section 32a disposed to project further inward (upward) of the chamber main body 31 than a bottom wall of the chamber main body 31 and an outer projecting section 32b disposed to project further outward (downward) of the chamber main body 31 than the bottom wall of the chamber main body 31.

As illustrated in FIG. 8 and the like, each of the inner projecting sections 32a forms a portion of a peripheral wall of a liquid receptacle section 38 described later.

Figure 18:
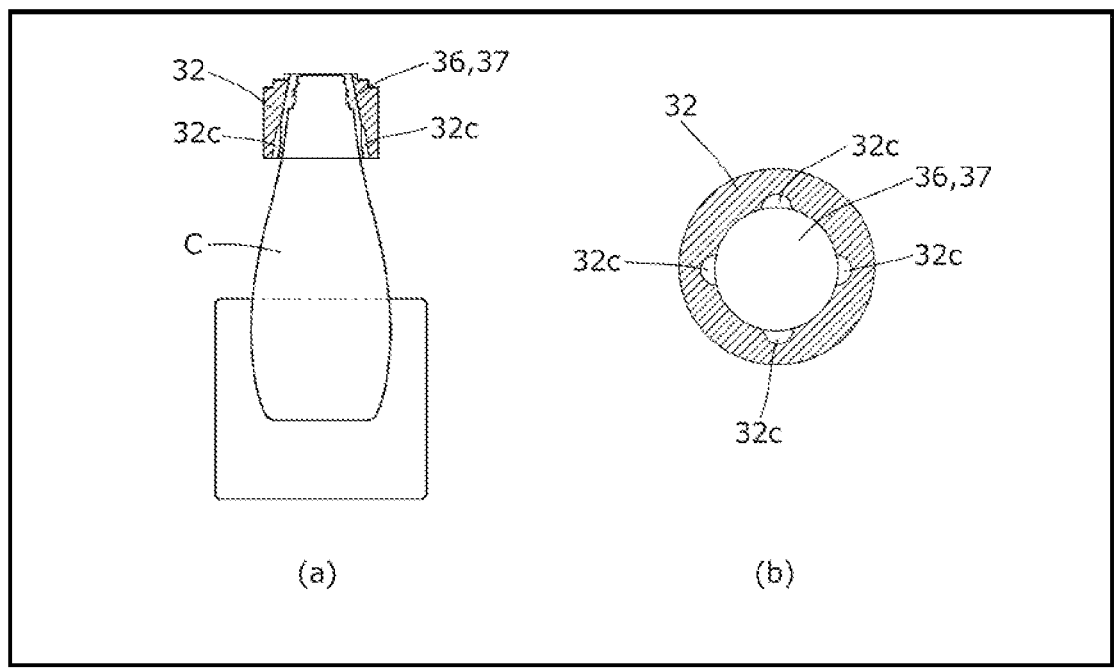
FIG. 18 is an illustrative view illustrating a modification of a ventilation section.

As illustrated in FIG. 8 and the like, each of the outer projecting sections 32b has a ventilation section 32c formed to take in outside air into a space between an inner peripheral side of the centering guide 32 and an outer peripheral side of each of the containers C in a state where the container C is inserted in the centering guide 32. In an example illustrated in FIG. 8 and the like, the ventilation section 32c is formed as a ventilation hole extending through the centering guide 32 between an inside and an outside thereof. The ventilation hole serving as the ventilation section 32c is disposed at a position which provides communication between the inside of the centering guide 32 and an outside of the chamber 30. Note that a specific mode of the ventilation section 32c is not limited to the ventilation hole described above and may be any as long as the ventilation section 32c can take in the outside air into the space between the inner peripheral side of the centering guide 32 and the outer peripheral side of the container C. For example, as illustrated in FIG. 18, the ventilation section 32c may also be recessed portions formed in an inner peripheral surface of the centering guide 32. In an example illustrated in FIG. 18, the plurality of recessed portions serving as the ventilation section 32c are formed equidistantly in a peripheral direction to reach a lower end of the inner peripheral surface of the centering guide 32.

As illustrated in FIG. 8 and the like, each of the centering guides 32 disposed in the first container processing area A2 has an opening, and the opening functions as a first container processing opening 36 into which the container C is to be inserted when the coater 50 performs processing on the container.

As illustrated in FIG. 8 and the like, each of the centering guides 32 disposed in the second container processing area A3 has an opening, and the opening functions as a second container processing opening 37 into which the container C is to be inserted when the mist collector 60 performs processing on the container.

Each of the container processing openings 36 and 37 is formed to be opened below the chamber 30 and provide communication between the gas flow control chamber 35 and the outside of the chamber 30.

As illustrated in FIG. 8 and the like, each of the container processing openings 36 and 37 communicates with the common gas flow control chamber 35.

Figure 10:
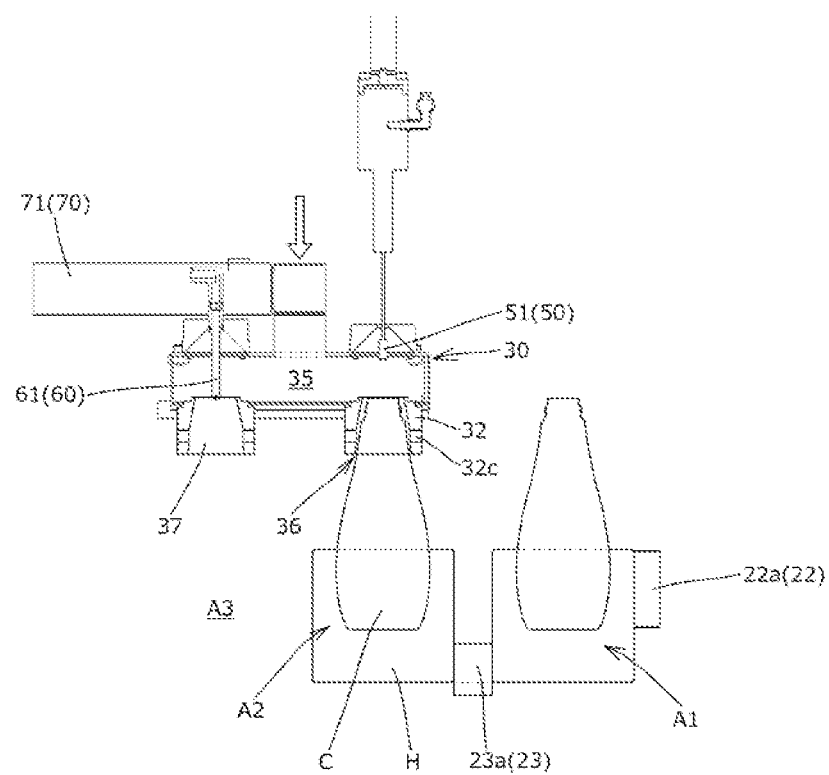
FIG. 10 is an illustrative view illustrating a second step of the container processing method.

As illustrated in FIG. 10 and the like, each of the container processing openings 36 and 37 is formed to have a size which allows only a portion of the container C (only an upper portion of the container C on a container inlet side) to pass therethrough when the container C is inserted.

As illustrated in FIG. 8 and the like, the attachment caps 34 are attached to fit into the third main body openings 31c and the fourth main body openings 31d.

Each of the attachment caps 34 has, on a lower surface side thereof facing the gas control chamber 35, a chamber inner surface 34a upwardly tapered and downwardly increased in diameter thereof at a position above the container processing opening 36 or 37.

The attachment caps 34 have, in center portions thereof, through holes 34b extending through the attachment caps 34 in the vertical direction.

The through holes 34b allow spray nozzles 51 or gas ejection nozzles 61 described later to be inserted therethrough in the vertical direction.

As illustrated in FIG. 8 and the like, each of the chambers 30 has the liquid receptacle section 38 formed at a position below the gas flow control chamber 35 and a duct for discharging a liquid stored in the liquid receptacle section 38 to the outside of the chamber 30.

The liquid receptacle section 38 is a space in the chamber main body 31 capable of storing the coating agent and including the bottom wall and side walls of the chamber main body 31, the inner projecting sections 32a of the centering guides 32, and the like.

The duct connects the chamber main body 31 and a mist box 72 described later.

Next, a description will be given below of the container processor 40.

As illustrated in FIGS. 1, 8, and the like, the container processor 40 includes the coater 50 that coats the inner wall surface of each of the containers C with the coating agent in the first container processing area A2, the mist collector 60 that collects the mist in each of the containers C in the second container processing area A3 set lateral to the first container processing area A2 opposite to the container transfer area A1, and a vertically moving driver 41 serving as an approach tool that causes the chambers 30 and the containers C to relatively approach each other.

Figure 16:
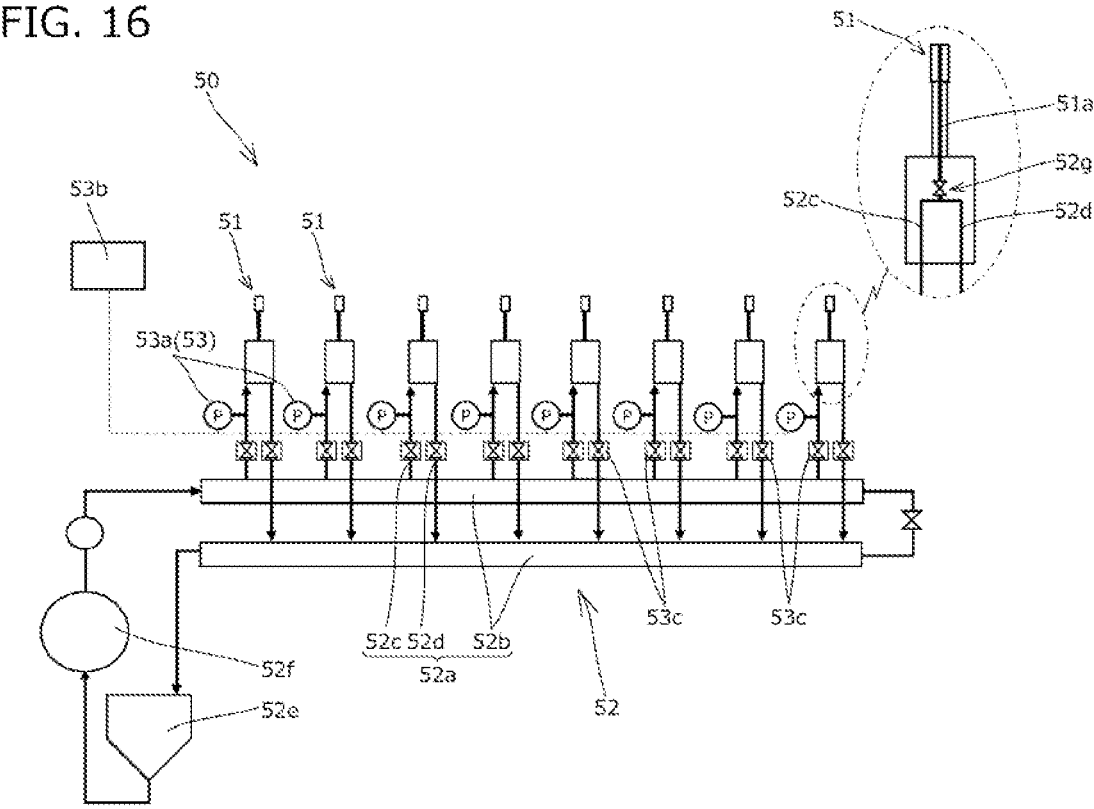
FIG. 16 is an illustrative view schematically illustrating a configuration of a coater.

As illustrated in FIGS. 8, 16, and the like, the coater 50 includes the spray nozzles 51 each serving as a container treater capable of ejecting the coating agent toward the inner wall surface of each of the containers C, a supply controller 52 that controls a supply of the coating agent to each of coating agent ejection paths 51a formed in the spray nozzles 51, a nozzle driver that drives the spray nozzle 51, and an ejected amount estimator 53 that estimates an amount of the coating agent ejected from each of the spray nozzles 51.

Figure 11:
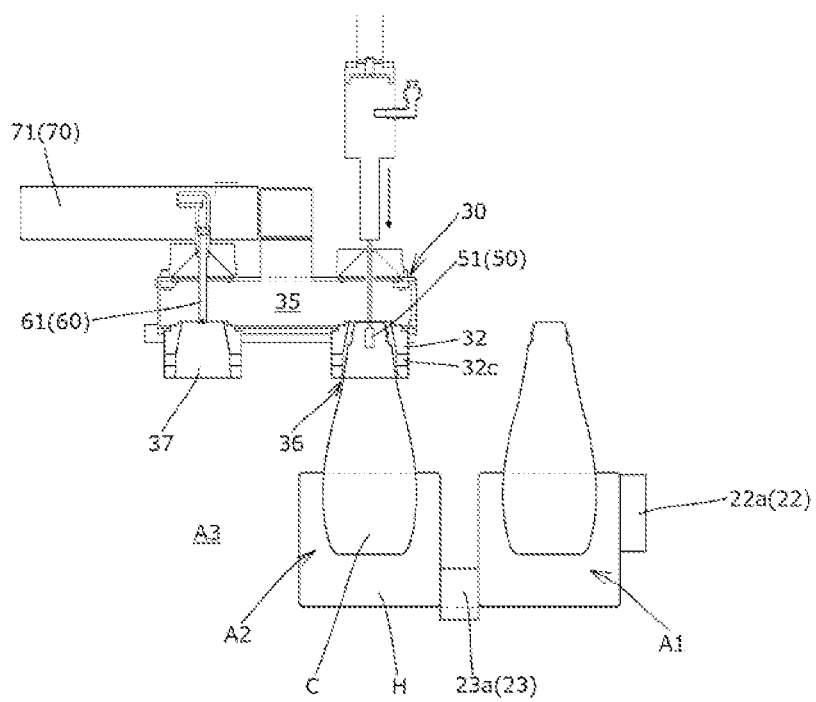
FIG. 11 is an illustrative view illustrating a third step of the container processing method.

As illustrated in FIGS. 2, 11, and the like, each of the spray nozzles 51 performs, from inside the gas flow control chamber 35, processing on each of the plurality of containers C disposed to be arranged in the container row direction in the first container processing area A2 and inserted in the chamber 30 through the first main body openings 31a.

Each of the spray nozzles 51 is configured to be movable in the vertical direction by the nozzle driver and rotatable around an axial line of the spray nozzle 51. As illustrated in FIG. 11 and the like, the spray nozzle 51 is configured to be inserted into the container C through the through hole 34b of the attachment cap 34 when the coating processing is performed and coat the inner wall surface of the container C with the coating agent for improving a slipping property of a content thereof, while being vertically moved and rotated in the container C.

Note that, during the coating processing, the gas in the gas flow control chamber 35 is sucked by the aspirator 70, and consequently the extra coating agent flown from the container C is sucked to be removed.

The nozzle driver drives the spray nozzle 51 and includes various actuators of an electrically-powered type, a hydraulically-driven type, and an air-driven type, various motors, and the like.

As illustrated in FIG. 16, the supply controller 52 has circulation paths 52a that circulate the coating agent, a coating agent tank 52e, a pump 52f, and openable/closable valves 52g.

As illustrated in FIG. 16, each of the circulation paths 52a includes a main pipe line 52b provided to be shared by the plurality of spray nozzles 51 and an out-going path 52c and an in-coming path 52d which are formed for each of the spray nozzles 51 and connected to the main pipe line 52b.

The coating agent tank 52e and the pump 52f are connected to the main pipe lines 52b, while the valves 52g are disposed between the coating agent ejection paths 51a and the circulation paths 52a (the out-going path 52c and the in-coming path 52d).

The supply controller 52 is configured such that, when the coating processing is performed, the valves 52g which are in a closed state at normal times are opened to supply the coating agent circulating in the circulation paths 52a to the coating agent ejection paths 51a through use of a pressure of the coating agent in the circulation paths 52a and cause the spray nozzles 51 to eject the coating agent.

The ejected amount estimator 53 has pressure sensors 53a that measure a variation of the pressure of the coating agent in each of the circulation paths 52a, an estimator 53b connected to the pressure sensors 53a, and throttle valves 53c that regulate flow rates of the coating agent.

In the present embodiment, as illustrated in FIG. 16, the pressure sensors 53a are attached to the individual out-going paths 52c so as to measure the variation of the pressure of the coating agent in each of the out-going paths 52c.

The estimator 53b includes a PLC having a CPU, a ROM, a RAM, and the like, a personal computer, and the like to estimate an amount of the ejected coating agent from an integrated value (i.e., an area value of each of portions S illustrated in FIG. 17) of pressure drops from before ejection at a time when the coating agent is ejected (when the valves 52g are set to ON) from each of the spray nozzles 51, which has been obtained on the basis of a variation of a pressure value of the coating agent measured by each of the pressure sensors 53a.

Then, the estimator 53b compares the integrated value of the pressure drops (estimated value of the amount of the ejected coating agent) to a preset threshold to sense occurrence of a problem such as clogging of the spray nozzle 51.

The throttle valves 53c are provided on an upstream side of the pressure sensor 53a in each of the out-going paths 52c and in each of the in-coming paths 52d. By regulating the flow rate of the coating agent using the throttle valves 53c, even when an extremely small amount of the coating agent is applied, a pressure drop when the coating agent is ejected is increased to allow easier estimation of the amount of the ejected coating agent.

Figure 17:
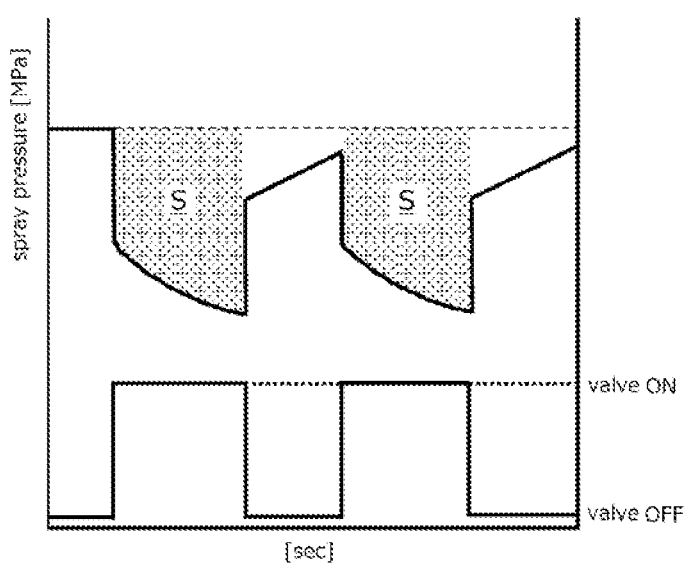
FIG. 17 is a graph illustrating a method of estimating an ejection amount of a coating agent.

FIG. 17 represents the variation of the pressure value of the coating agent measured by each of the pressure sensors 53a when the coating agent is ejected from the spray nozzle 51.

The pressure value before the ejection of the coating agent remains at a given value but, as soon as the ejection is started, the pressure value significantly decreases and then gradually decreases during the ejection. Then, when the ejection is stopped, the pressure value returns to the value before the ejection.

At this time, the integrated value of the pressure drops (area value of each of the portions S in FIG. 17) and the amount of the ejected coating agent have a correlationship therebetween. Consequently, it is possible to estimate the amount of the ejected coating agent from the area value of the portion S.

When the amount of the ejected coating agent decreases due to clogging of the spray nozzle 51 or the like, a pressure drop when the coating agent is ejected decreases, and accordingly the area value of the portion S decreases.

Therefore, by monitoring the area value of the portion S, it is possible to sense abnormality in the amount of the ejected coating agent.

As a conventional technique, there is a method which detects a pressure value with given timing during the ejection of the coating agent to sense abnormality in the ejected amount. However, when abnormality occurs in the ejected amount during the ejection, it is possible that the conventional method cannot sense the abnormality depending on the timing of detecting the pressure value.

According to the method in the present embodiment, it is possible to estimate a coating amount using the integrated value of the pressure drops during the ejection. Therefore, even when abnormality occurs in the coating amount during the ejection, it is possible to precisely sense the abnormality.

As illustrated in FIG. 8 and the like, the mist collector 60 includes the gas ejection nozzles 61 serving as the container treater capable of ejecting a gas into each of the containers C. The mist collector 60 is configured to insert each of the gas ejection nozzles 61 into the container C subjected to the coating processing performed in a state where the gas in the gas flow control chamber 35 is sucked by the aspirator 70 to eject the gas such as air into the container C and thus expel and remove the extra misty coating agent from inside the container C.

The plurality of gas ejection nozzles 61 are disposed to be arranged in the container row direction in the second container processing area A3 to perform, from inside the gas flow control chamber 35, processing on the containers C inserted in the chamber 30 through the second container processing openings 37.

As illustrated in FIG. 8 and the like, each of the gas ejection nozzles 61 is inserted into the chamber 30 through the through hole 34b of the attachment cap 34 and attached in a fixed state to the chamber 30 to have a tip portion thereof disposed in the chamber 30.

The vertically moving driver 41 includes various actuators of an electrically-powered type, a hydraulically-driven type, and an air-driven type, various motors, and the like. The vertically moving driver 41 moves each of the chambers 30 along the vertical direction. The vertically moving driver 41 is configured to move the chamber 30 downward and thereby cause the containers C to be inserted into the chamber 30 through the container processing openings 36 and 37.

Note that the gas ejection nozzles 61 attached to the chamber 30, suction hoses 71, and the like are also configured to be vertically moved by the vertically moving driver 41.

Next, a description will be given of the aspirator 70.

Figure 15:
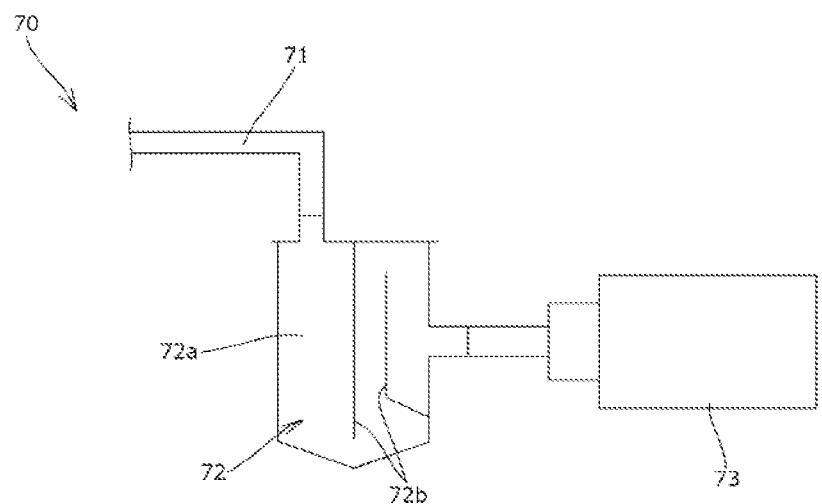
FIG. 15 is an illustrative view schematically illustrating a configuration of a aspirator.

The aspirator 70 sucks in the gas in the gas flow control chamber 35 of each of the chambers 30. As illustrated in FIGS. 8, 15, and the like, the aspirator 70 includes the suction hoses 71 connected to the chambers 30, the mist box 72 connected to the suction hoses 71, and a mist collector 73 connected to the mist box 72 and having a filter disposed therein.

The suction hoses 71 are connected individually to the plurality of (four) chambers 30 disposed to be arranged along the container row direction. All the suction hoses 71 are connected to the mist box 72.

As illustrated in FIG. 15, the mist box 72 has an inner space 72a and a baffle plate 72b disposed in the inner space 72a.

The baffle plate 72b regulates a flow of the mist in the inner space 72a and the baffle plate 72b itself is exposed to the mist containing the coating agent to separate the mist into a liquid and a gas.

The gas resulting from the separation by the baffle plate 72b is discharged to an outside of the inner space 72a through a duct connected to the mist box 72.

The liquid resulting from the separation by the baffle plate 72b is delivered to a discharged liquid collection box through the duct connected to the mist box 72.

The mist collector 73 is also connected to the discharged liquid collection box through the duct. The liquid separated by a filter in the mist collector 73 is delivered to the discharged liquid collection box.

Next, a description will be given of a container processing method to be implemented by the container processing system 10 in the present embodiment. Note that, for easy understanding of the container processing method, the following will describe processing performed on one container row with time.

First, the containers C being held by the container holders H are arranged in a row and conveyed by the container carrier 21 along the container conveying path 21a toward the container transfer area A1.

Figure 5:
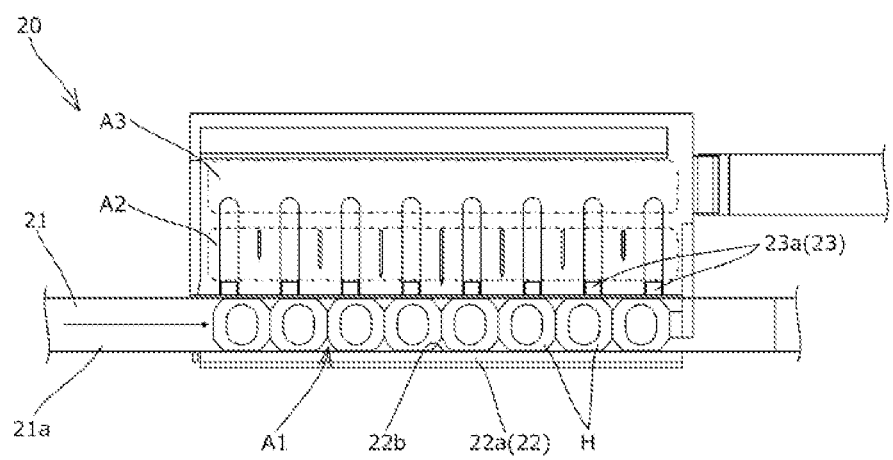
FIG. 5 is an illustrative view illustrating a state where a container row is moved to a container transfer area.
Figure 6:
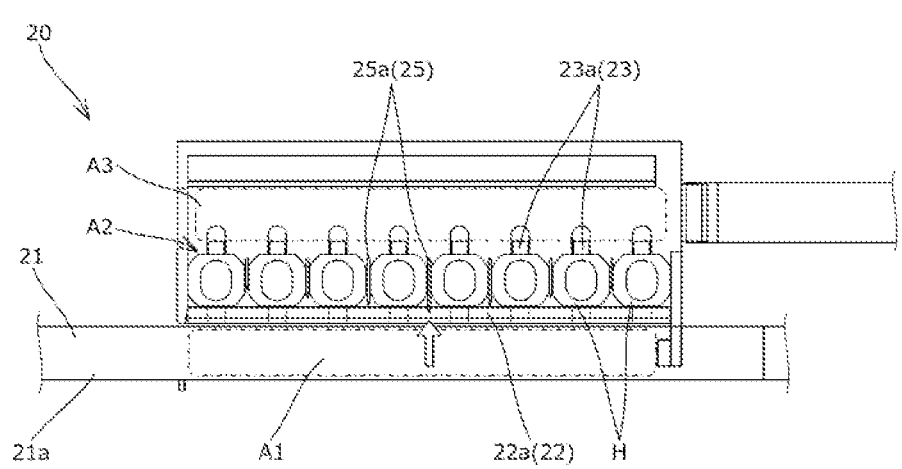
FIG. 6 is an illustrative view illustrating a state where the container row is moved to a first container processing area.

Next, as illustrated in FIG. 5, the predetermined number of (eight in the present embodiment) containers C are fed into the container transfer area A1, and then the container stopper 29A is closed. As illustrated in FIG. 6, the plurality of containers C fed into the container transfer area A1 are pushed out using the first feeding pusher 22a of the first container transferer 22 to be moved from the container transfer area A1 to the first container processing area A2.

At this time, in the first container processing area A2, the plurality of guide pieces 25a are disposed to be arranged at predetermined intervals along the container row direction. Therefore, it is possible to insert, between the guide pieces 25a, the containers C (container holders H) pushed out by the first feeding pusher 22a toward the first container processing area A2 and thereby determine the respective positions of the individual containers C (container holders H) in the container row direction.

Next, as illustrated in FIG. 10, the chamber 30 is moved downward by the vertically moving driver 41 to insert the upper portion of the container C into the first container processing opening 36 of the chamber 30.

At this time, the first container processing opening 36 is formed to have a size which allows only a portion of the container C (only the upper portion of the container C on the container inlet side) to pass therethrough, and the container C is held by the container holder H, while having allowance in a horizontal direction. Consequently, even when there is a slight displacement between a center of the first container processing opening 36 and a center of the container C in the horizontal direction, it is possible to cause an edge portion of the first container processing opening 36 to guide the container C in the horizontal direction and center the container C with respect to the first container processing opening 36.

Next, as illustrated in FIG. 11, the spray nozzle 51 of the coater 50 is moved downward to be inserted into the container C and apply the coating agent to the inner wall surface of the container C, while being vertically moved and rotated (positively/negatively rotated at a predetermined angle).

At this time, since the aspirator 70 has sucked in the gas in the gas flow control chamber 35, the extra coating agent is sucked to be removed.

Also, as illustrated in FIG. 11, in the centering guide 32, the ventilation section 32c is formed at the position which provides communication between the inside of the centering guide 32 and the outside of the chamber 30, and it is possible to take in outside air into the space between the inner peripheral side of the centering guide 32 and the outer peripheral side of the container C through the ventilation section 32c. Therefore, it is possible to avoid a situation in which, due to the suction of the gas in the chamber 30 by the aspirator 70, the container C clings to an inner peripheral portion of the centering guide 32 and also inhibit the processing liquid such as the coating agent from being attached to an outer surface of the container C due to a gas flow formed between the inner peripheral side of the centering guide 32 and the outer peripheral side of the container C.

Figure 12:
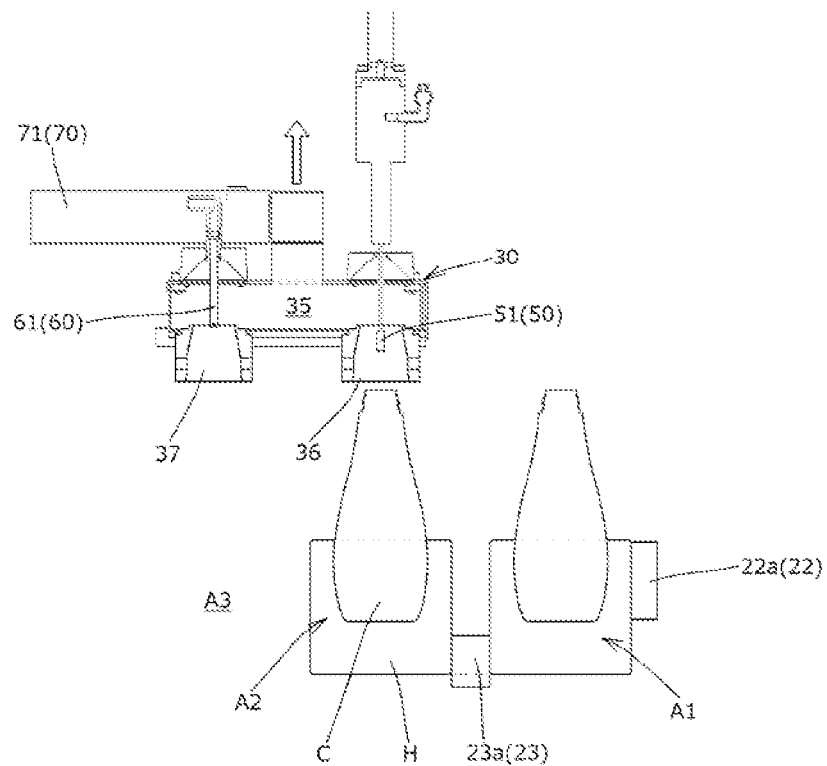
FIG. 12 is an illustrative view illustrating a fourth step of the container processing method.

Next, as illustrated in FIG. 12, the chamber 30 is moved upward by the vertically moving driver 41 to cause the container C to relatively come off through the first container processing opening 36 of the chamber 30.

Figure 13:
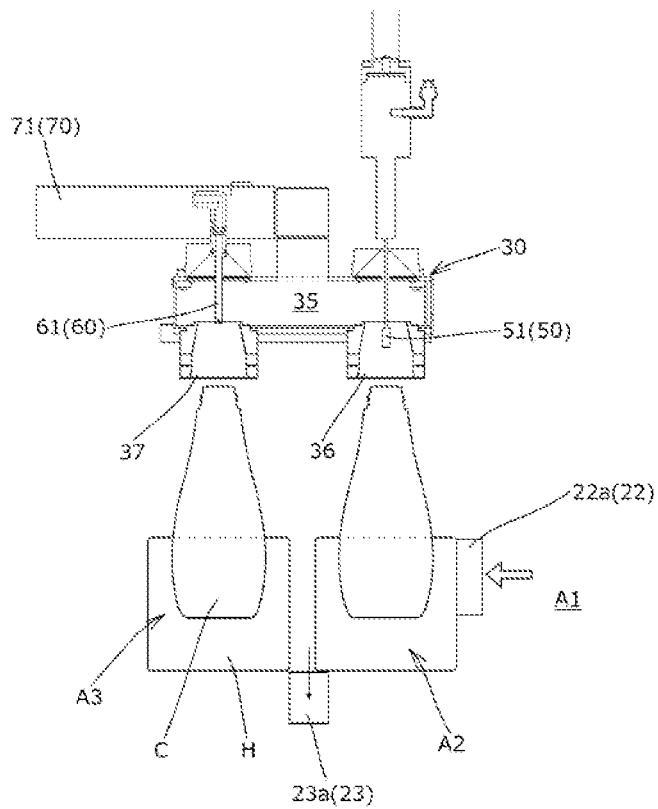
FIG. 13 is an illustrative view illustrating a fifth step of the container processing method.
Figure 14:
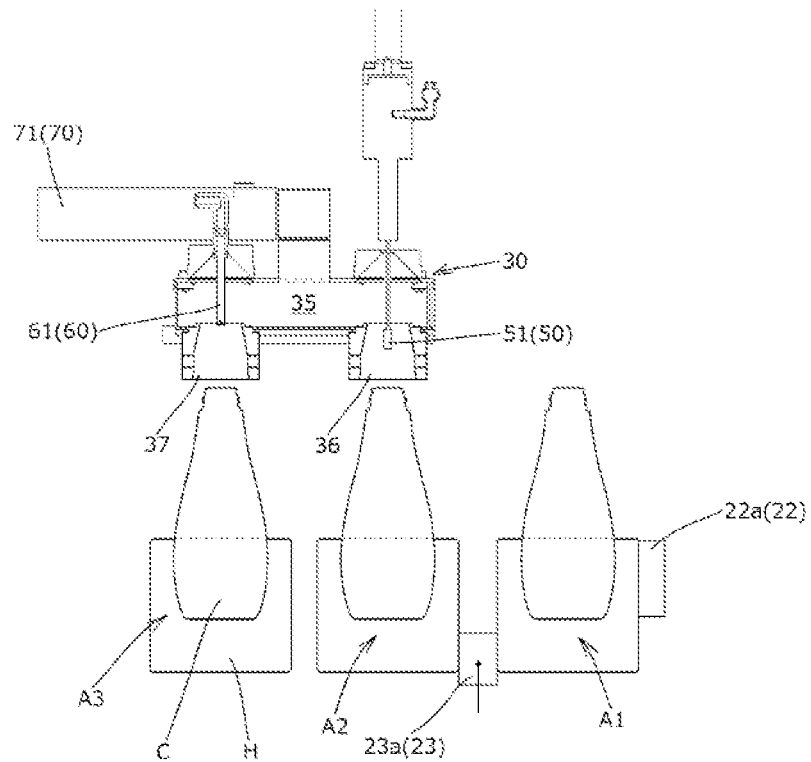
FIG. 14 is an illustrative view illustrating a sixth step of the container processing method.

Next, as can be seen from FIGS. 12 and 13, the plurality of containers C arranged in the container row direction in the container transfer area A1 are pushed out by the second feeding pusher 23a of the second container transferer 23 to be moved from the first container processing area A2 into the second container processing area A3.

Next, the chamber 30 is moved downward by the vertically moving driver 41 to insert the upper portion of the container C into the second container processing opening 37 of the chamber 30 and also insert the gas ejection nozzle 61 of the mist collector 60 into the container C.

Next, in a state where the gas in the gas flow control chamber 35 is sucked by the aspirator 70, a gas such as air is ejected from the gas ejection nozzle 61 to expel and remove the extra misty coating agent from inside the container C.

Next, by the vertically moving driver 41, the chamber 30 and the gas ejection nozzle 61 are moved upward to extract the gas ejection nozzle 61 from inside the container C and also relatively extract the container C through the second container processing opening 37 of the chamber 30.

Finally, using the lever 24, the plurality of containers C arranged in a row in the second container processing area A3 are pushed out to a downstream side.

Figure 7:
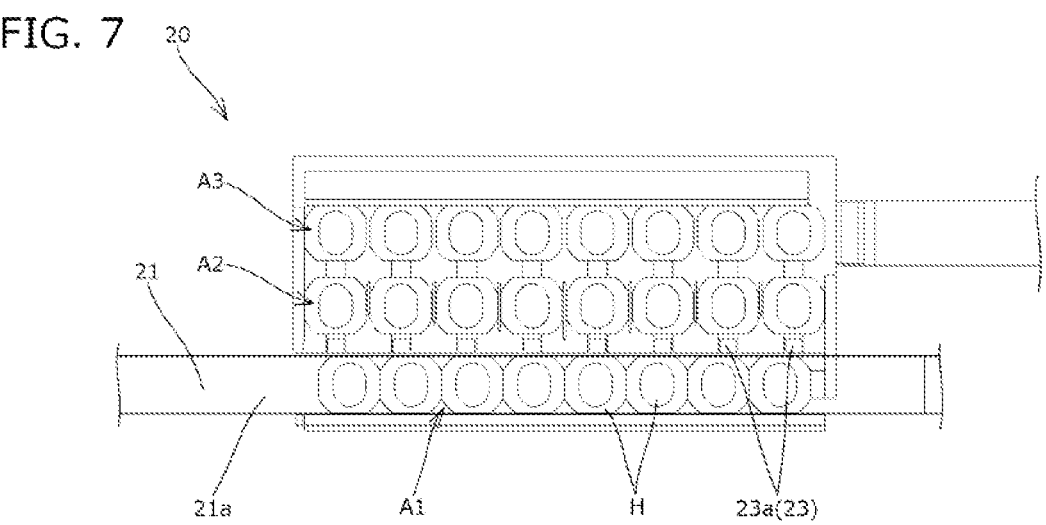
FIG. 7 is an illustrative view illustrating a state where the container row is disposed in each of the container transfer area and the container processing areas.

Note that, for easier understanding of the container processing method, the processing performed on one container row has been described above with time. However, as a specific mode of the container processing method, as illustrated in FIGS. 1, 2, and 7, the coating processing and the mist collecting processing may also be simultaneously performed on different container rows.

In FIGS. 3 and 5 to 7, for easy understanding of a configuration of each of the parts, the illustration of the container C is omitted.

While the embodiment of the present invention has been described heretofore in detail, the present invention is not limited to the embodiment described above. Various design modifications can be made without departing from the present invention described in appended claims.

For example, the embodiment described above explains that the container processor 40 performs the coating processing and the mist collecting processing. However, specific details of the processing performed on the containers C by the container processor 40 are not limited to those described above. For example, the container processor 40 may also be configured so as to perform cleaning processing on the containers C. In this case, the processing liquid to be sprayed onto the containers C is cleaning water such as water.

Also, the embodiment described above explains that each of the containers C is a plastic container to be filled with a viscous content such as a mayonnaise-like food item. However, a specific mode of the container C and a use purpose thereof may be any.

Also, the embodiment described above explains that the container processing system 10 is configured to perform, in the chambers 30, various processing on the containers C inserted in the chambers 30 through the container processing openings 36 and 37. However, the container processing system 10 may also be configured to perform, from inside the gas flow control chamber 35, various processing on the containers C opposed to the container processing openings 36 and 37 outside the chambers 30 without inserting the containers C into the chambers 30.

Also, the embodiment described above explains that the container processing openings 36 and 37 are formed to be opened below the chambers 30. However, the container processing openings 36 and 37 may be opened in any direction. For example, the container processing openings 36 and 37 may also be formed to be opened laterally to the chambers 30 or formed to be opened above the chambers 30.

Also, in the embodiment described above, it is assumed that the approach tool is formed of the vertically moving driver 41 that vertically moves the chambers 30 and the like. However, a specific mode of the approach tool may be any as long as the approach tool allows the chambers 30 and the containers C to relatively approach each other. For example, the approach tool may be configured to move the containers C and thus cause the chambers 30 and the containers C to relatively approach each other or may also be configured to move both of the containers C and the chambers 30 and thus cause the chambers 30 and the containers C to relatively approach each other.

The direction in which the chambers 30 or the containers C are moved by the approach tool is also not limited to the vertical direction.

Also, in the embodiment described above, it is assumed that the container carrier 21 is formed of the conveyer belt. However, a specific mode of the container carrier 21 may be any as long as the container carrier 21 can convey the containers C. For example, the container carrier 21 may also use a turret or the like.

Also, in the embodiment described above, it is assumed that the container transferer 22 and 23 use the feeding pushers 22a and 23a to transfer the containers C. However, the specific mode of the container transferer 22 and 23 may be any as long as the container transferer 22 and 23 can transfer the container C. For example, the container transferer 22 and 23 may also hold the containers C and move the containers C in the container transfer direction.

Also, in the embodiment described above, it is assumed that the containers C are arranged in the single row and conveyed along the container conveying path 21a. However, the containers C may also be arranged in a plurality of two or more rows and conveyed along the container conveying path 21a.

Also, in the embodiment described above, it is assumed that the container conveyer 20 conveys the containers C being held by the container holders H. However, the container conveyer 20 may also be configured to directly handle the containers C which are not held by the container holders H.

Also, in the embodiment described above, it is assumed that the spray nozzles 51 are movable by the nozzle driver relative to the chambers 30. However, similarly to the gas ejection nozzles 61, the spray nozzles 51 may also be disposed in a fixed state with respective to the chambers 30.

Similarly to the spray nozzles 51, the gas ejection nozzles 61 may also be configured to be movable by the nozzle driver relative to the chambers 30.

Also, in the embodiment described above, it is assumed that the container row direction and the container conveyance direction are parallel with each other, and each of the container row direction and the container conveyance direction and the container transfer direction are perpendicular to each other. However, the container row direction and the container conveyance direction may also be set non-parallel with each other or, alternatively, the container transfer direction may also be set to cross each of the container row direction and the container conveyance direction at an angle other than 90°.

REFERENCE SIGNS LIST

10 Container processing system
20 Container conveyer
21 container carrier
21a Container conveying path
22 First container transferer
22a First feeding pusher
22b Feeding surface
23 Second container transferer
23a Second feeding pusher
24 Lever
25 Guide
25a Guide piece
25b Front-side guide end portion
26 Container presence/absence sensor
27 Container holder number sensor
28 Alignment checking sensor
29A Container stopper
29B Stopper
30 Chamber
31 Chamber main body
31a First main body opening
31b Second main body opening
31c Third main body opening
31d Fourth main body opening
32 Centering guide (cylindrical portion)
32a Inner projecting section
32b Outer projecting section
32c Ventilation section
34 Attachment cap
34a Chamber inner surface
34b Through hole
35 Gas flow control chamber
36 First container processing opening
37 Second container processing opening
38 Liquid receptacle section
40 Container processor
41 Vertically moving driver (approach tool)
50 Coater
51 Spray nozzle (container treater)
51a Coating agent ejection path
52 Supply controller
52a Circulation path
52b Main pipe line
52c Out-going path
52d In-coming path
52e Coating agent tank
52f Pump
52g Valve
53 Ejected amount estimator
53a Pressure sensor 53b Estimator
53c Throttle valve
60 Mist collector
61 Gas ejection nozzle (container treater)
70 Aspirator
71 Suction hose
72 Mist box
72a Inner space
72b Baffle plate
73 Mist collector
A1 Container transfer area
A2 First container processing area
A3 Second container processing area
C Container
H Container holder

The invention claimed is:

1. A container processing system for performing processing on containers, the container processing system comprising:
   a container conveyer including a container conveying path for conveying the containers arranged in a row;
   a container processor for performing processing on the containers in a container processing area set lateral to a container transfer area set in a segment of the container conveying path; and
   a chamber having a gas flow control chamber;
   wherein the container conveyer includes a container carrier for conveying the containers arranged in the row along the container conveying path and a container transferer for moving, toward the container processing area, a container row including the plurality of containers arranged in the row in the container transfer area;
   the container processing area includes a first container processing area and a second container processing area, the first container processing area is set lateral to the container transfer area, the second container processing area is set on a side of the first container process area opposite to the container transfer area;
   a first container transferer is configured to move the container row including the plurality of containers arranged in the row in the container transfer area toward the first container processing area, and a second container transferer is configured to move the container row including the plurality of containers arranged in the row in the first container processing area toward the second container processing area;
   the chamber is disposed to extend between the first container processing area and the second container processing area, the chamber has a plurality of first container processing openings arranged in the container row direction and a plurality of second container processing openings arranged in the container row direction, the first container processing openings communicate the gas flow control chamber with outside of the chamber in the first container processing area, and the plurality of second container processing openings communicate with the gas flow control chamber with outside of the chamber in the second container processing area, and the plurality of first container processing openings and the plurality of second container processing openings are configured to allow upper portions of the containers to be inserted into the chamber.

2. The container processing system according to claim 1, wherein the first container transferer includes a feeding pusher having a feeding surface for collectively pushing the container row in the container transfer area toward the first container processing area.

3. The container processing system according to claim 2, wherein
   the container conveyer includes a guide for positioning, in a container row direction in which the containers are arranged, each of the containers arranged in the row in the container processing area, and
   the guide includes a plurality of guide pieces formed in the container processing area in a state of being arranged at predetermined intervals along the container row direction and configured to cause the containers to be disposed therebetween individually, thereby positioning the containers.

4. The container processing system according to claim 3, wherein
   each of the guide pieces has a front-side guide end portion located on the container transfer area side, and
   the plurality of guide pieces are formed such that the front-side guide end portion of the guide piece located on an outer side in the container row direction is located at a position more distant from the container transfer area than the front-side guide end portion of the guide piece located on a center side in the container row direction.

5. The container processing system according to claim 1, wherein
   the container conveyer is configured to convey the containers in a state of being held by container holders, and
   the container conveyer includes a container presence/absence sensor for detecting whether or not the containers are held by the container holders conveyed along the container conveying path.

6. The container processing system according to claim 1, wherein
   the container conveyer is configured to convey the containers in a state of being held by container holders, and
   the container conveyer includes a container holder number sensor for counting the number of the container holders and a container stopper disposed at an entrance of the container transfer area to prevent the containers from moving to the container transfer area on the basis of the number of the container holders counted by the container holder number sensor.

7. The container processing system according to claim 1, wherein the container conveyer includes an alignment checking sensor for checking positions, at which the containers in the container row are aligned, in the container transfer area.

8. The container processing system according to claim 1, wherein the container processor includes a plurality of container treaters disposed to be arranged along the container row direction in the container processing area and performing processing on the containers individually.

9. The container processing system according to claim 1, wherein
   the container processor includes a coater for coating an inner wall surface of each of the containers with a coating agent in the container processing area and a mist collector for collecting mist in each of the containers in a second container processing area set lateral to the container processing area and on an opposite side thereof to the container transfer area, and the container conveyer includes a second container transferer for moving the container row in the container processing area toward the second container processing area.

* * * * *